United States Patent [19]

Wright et al.

[11] 4,159,371

[45] Jun. 26, 1979

[54] FLAME-RETARDANT RESIN COMPOSITIONS

[75] Inventors: Carl L. Wright, Pasadena; Harry H. Beacham, Severna Park, both of Md.

[73] Assignee: FMC Corporation, Philadelphia, Pa.

[21] Appl. No.: 783,533

[22] Filed: Apr. 1, 1977

Related U.S. Application Data

[60] Division of Ser. No. 575,515, May 8, 1975, Pat. No. 4,034,136, which is a division of Ser. No. 95,418, Dec. 4, 1970, Pat. No. 3,936,414, which is a continuation-in-part of Ser. No. 837,911, Jun. 30, 1969, abandoned.

[51] Int. Cl.$^2$ .................. C08G 61/12; C08G 61/00
[52] U.S. Cl. .................. 528/271; 106/15.05; 260/40 R; 528/367; 528/368; 528/392
[58] Field of Search .............. 526/11.1; 528/392, 271, 528/367, 397, 368

[56] References Cited

U.S. PATENT DOCUMENTS

| | | | |
|---|---|---|---|
| 2,547,696 | 4/1951 | Foster | 526/11.1 |
| 2,564,214 | 8/1951 | Ross et al. | 526/11.1 |
| 3,193,538 | 7/1965 | Canterino et al. | 526/11.1 |
| 3,326,829 | 6/1967 | Duchesneau et al. | 526/11.1 |
| 3,349,069 | 10/1967 | Davis et al. | 526/11.1 |
| 3,361,847 | 1/1968 | Zimmermann et al. | 260/869 |
| 3,418,259 | 12/1968 | Kennedy et al. | 526/11.1 |
| 3,442,882 | 5/1969 | Weichman et al. | 526/11.1 |
| 3,525,730 | 8/1970 | Nutzel et al. | 526/11.1 |
| 3,862,263 | 1/1975 | Maruta et al. | 260/874 |
| 4,128,709 | 12/1978 | Vollkommer et al. | 526/218 |

*Primary Examiner*—Herbert J. Lilling

[57] ABSTRACT

This specification discloses that certain polychlorinated or polybrominated aromatic hydrocarbon compounds can be incorporated in thermosetting polymer compositions to make the thermosetting compositions flame retardant without injuring the desirable physical and electrical properties of the thermosetting compositions when in the thermoset state. These polyhalogenated aromatic hydrocarbons are apparently caused to reset into the thermosetting composition, provided there is a minimum of 1 mol of a polyunsaturated monomer containing carbon to carbon unsaturation for each 3 mols of polychlorinated aromatic hydrocarbons. The thermosetting compositions generally contain a polyunsaturated monomer, a polyunsaturated polymer with carbon to carbon double bond unsaturation or a polyphenylene ether polymer which may be used in place of some or all of the polyunsaturated polymer, and a polyhalogenated aromatic hydrocarbon, containing at least 50% by weight combined chlorine or bromine and whose molecular weight is greater than 200. These thermosetting compositions can be heat cured or thermoset by a free radical initiator at a temperature of at least 130° C., and can contain pigments, reinforcing fibers, release agents, coupling agents, and other incidental amounts of additives commonly used in thermosetting resin compositions.

3 Claims, No Drawings

FLAME-RETARDANT RESIN COMPOSITIONS

CROSS REFERENCE TO RELATED APPLICATION

This is a division, of application Ser. No. 575,515, filed May 8, 1975, and now U.S. Pat. No. 4,034,436 which is a division of application Ser. No. 95,418, now U.S. Pat. No. 3,936,414, filed Dec. 4, 1970, which is a continuation-in-part of Ser. No. 837,911, filed June 30, 1969, now abandoned.

BACKGROUND OF THE INVENTION

A. Field of the Invention

This invention relates to thermosetting polymerizable compositions and particularly to flame-retardant thermosetting molding compositions.

B. Description of the Prior Art

Thermosetting polymerizable compositions, commonly termed thermosetting resins, are widely used in making castings, laminates, and molded articles. The high strength to weight ratios of thermoset resins when properly reinforced and cured and the resistance of these compositions to environmental conditions have suggested the application of thermoset compositions in numerous applications, including many applications where combustibility is a serious consideration.

A number of methods have been employed to reduce the rate of combustion of thermoset resin compositions. These methods have included the use of numerous flame-retardant additives, including inorganic additives, organic additives, a combination of inorganic and organic additives, the addition of a flame-retardant element that reacts and becomes part of the thermoset resin, and combinations of all these methods.

The use of inorganic fillers to impart flame retardance is attractive on a cost basis. Typical inert flame-retardant fillers retard the burning rate to the extent that they act as diluents of the combustible components. However, large amounts of fillers adversely affect the electrical properties of thermoset resin compositions.

Organic compounds containing halogen and phosphorous atoms such as chlorinated paraffins, chlorinated biphenyls, chlorinated aryl substituted alkyls, phosphorus containing hydrocarbons, and the like have been used for many years to impart flame resistance to plastic compositions including thermoset resins. The chlorinated materials are quite effective as flame retardants. The flame-retarding mechanism is believed to involve the release of hydrogen chloride at combustion temperatures which snuff out the flame by exclusion of oxygen. Only highly chlorinated organic materials have been considered, since the objective is to provide maximum flame resistance with a minimum of additive material. These highly chlorinated organics, including those which are solid, have a plasticizing action on thermoset compositions. Generally the plasticizing action of the chlorinated organic compounds lowers the heat deflection temperature and otherwise impairs the desirable properties of cured thermosetting resins.

Combinations of chlorinated organic additive with antimony trioxide have been known for a number of years. The effect of certain other metal oxides, such as magnesia or hydrated alumina, combined with antimony oxides in flameproofing chlorinated polymers, was noted by D. C. Thompson et al in an article entitled "Flame Resistance of Neoprene" appearing in the August 1958 issue of Rubber Age. Combinations of hydrated alumina with antimony oxide and chlorinated organics are widely recognized as effective flame retardants for resinous compositions including thermoset resin compositions.

Satisfactory flame resistance in thermoset polymers has been obtained by using reactive chlorinated intermediates which become a part of the cured thermoset system, thus avoiding the plasticizing effect experienced when using chlorinated paraffins, chlorinated polyphenyls and the like. An important advance in the chemistry of self-extinguishing or flame-retardant thermoset resins occurred as a result of the discovery of a commercial method of making chlorendic acid or anhydride in 1952. Chlorendic acid and anhydride have been esterified to form polyesters similar to those obtained when using phthalic anhydride. Additionally, chlorendic acid and anhydride have been used to prepare reactive monomers, such as diallyl chlorendate, which are useful in flameproofing thermosetting resins such as polyesters and diallylic phthalates without substantially reducing the desirable physical properties of the thermoset resin compositions.

The addition of a reactive flame-retardant additive to thermoset resins such as polyesters and diallylic phthalate resins is highly desirable, as this method of flameproofing offers flexibility in resin production, since it is possible to flameproof general-purpose resins rather than to make special flame-retardant grade resins. The chlorendic acid-based reactive flame-retardant materials are expensive and since 1952 no efficient and inexpensive reactive flame retardants for thermoset resins have been widely accepted. The principal object of this invention is the preparation of highly flame-retardant, inexpensive, thermosetting resin compositions.

SUMMARY OF THE INVENTION

We have now discovered that certain polychlorinated and polybrominated aromatic hydrocarbon compounds can be incorporated in thermosetting polymer compositions to make the compositions flame retardant without injuring the desirable physical and electrical properties of the thermosetting compositions when in the thermoset state. We have found that this result is achieved by adding at least 1 mol of a polyunsaturated monomer with carbon to carbon unsaturation to the thermosetting composition for each 3 mols of polychlorinated or polybrominated aromatic hydrocarbon added to the thermosetting composition.

These thermosetting compositions generally comprise: (a) 100 parts by weight of a blend of about 10 to about 70 parts of a polyunsaturated monomer with carbon to carbon unsaturation, with about 90 to about 30 parts of a polymer of the class consisting of a polyunsaturated polymer with carbon to carbon unsaturation and polyphenylene ether polymers, and (b) about 5 to 50 parts by weight per 100 parts of "a" of a polychlorinated or polybrominated aromatic hydrocarbon containing at least 50% by weight of combined chlorine or bromine and whose molecular weight is greater than 200, in an amount not in excess of 3 mols of polyhalogenated aromatic hydrocarbon for each mol of the polyunsaturated monomer in "a." These novel thermosetting compositions can also include pigments, fillers, reinforcing fibers, release agents, coupling agents and other incidental additives in amounts commonly used in thermosetting resin compositions.

We have also discovered that where high monomer levels cannot be tolerated, as in high-pressure molding compounds, it is possible to prereact the polychlorinated or polybrominated compound with monomer prior to adding the polyhalogenated aromatic hydrocarbon in the thermosetting composition. The polyhalogenated aromatic compound is prereacted with the monomer by heating 3 to 2 mols of the polyhalogenated aromatic hydrocarbon with 2 to 3 mols of the polyunsaturated monomer containing carbon to carbon unsaturation at a temperature of at least 130° C. in the presence of a free radical initiator for a period of time sufficient to initiate an exothermic reaction between the polyhalogenated aromatic compound and the monomer, generally about 2 to about 10 minutes. These reaction products can be added to thermosetting compositions and thermoplastic compounds as flame-retardant additives.

Another phase of our invention is the discovery that certain of our novel compositions adhere strongly to a wide variety of substrates including metals. The compositions of this invention which are useful as thermosetting coatings generally comprise: (a) 10 to 50 parts by weight of a polyunsaturated monomer containing carbon to carbon unsaturation. (b) 5 to 30 parts by weight of a polychlorinated or polybrominated aromatic hydrocarbon containing at least 50% by weight of chlorine or bromine and having a molecular weight of at least 200, the ratio of monomer to polyhalogenated aromatic hydrocarbon being at least 1 to 3 respectively. (c) 20 to 60 parts by weight of a polyphenylene ether polymer, and (d) 0 to 30 parts by weight of a polyunsaturated polymer containing carbon to carbon unsaturation. Because it is not necessary to dissolve the polyphenylene ether polymer portion of these coating compositions, the compositions may be dispersed in a liquid for ease of application, thus making it possible to prepare very high solids coatig compositions containing as much as 70% solids. The compositions are useful for coating articles to seal them against moisture, as coating compositions for impregnating glass fabric and the like for making laminates, and because they adhere well to metal, they are useful in adhering metal to metal and metal to plastics such as in preparing a copper clad glass laminate.

All of our novel thermosetting compositions can be thermoset by free radical initiators at temperatures of at least 130° C. for a period of time sufficient to initite an exothermic reaction during which the polychlorinated or polybrominated aromatic compound reacts into the other components of the compositions and loses its thermoplastic or plasticizing properties.

DESCRIPTION OF THE INVENTION AND THE PREFERRED EMBODIMENTS

The polychlorinated or polybrominated aromatic hydrocarbons containing at least 50% by weight combined chlorine and whose molecular weight is greater than 200, useful in practicing this invention, include, but are not limited to, compounds such as chlorinated and brominated biphenyls and terphenyls, trichlorobenzene and higher chlorinated benzenes and alkyl substituted benzenes, chlorinated naphthalenes, and the like.

Polyunsaturated polymers useful in practicing this invention include, but are not limited to, diallylic phthalate prepolymers and polyester resins. Diallylic phthalate prepolymers useful in practicing this invention include prepolymers made from the diallylic esters of ortho-, iso-, and terephthalic acids. These diallylic phthalates may be manufactured by polymerizing a monomeric material to produce a solution of soluble prepolymer in monomer. Polymerization is carried to a point short of gelation. The prepolymer must then be separated from the unpolymerized monomer. This may be done by treatment with a solvent which dissolves the monomer and precipitates the prepolymer. Such a general process is described by Heiberger in U.S. Pat. No. 3,096,310. A conventional method of separating allylic prepolymer from monomer by precipitating the prepolymer in an unreactive liquid precipitant that is a solvent for the monomer and a nonsolvent for the prepolymer in a shearing zone is described by Willard in U.S. Pat. No. 3,030,341. Prepolymers may also be separated from unpolymerized monomer by distillation as disclosed by Mednick et al in U.S. Pat. No. 3,285,836 issued May 28, 1968. The diallyl phthalate prepolymers are solids containing little or no monomer; they can be stored indefinitely in this form, since they require catalysts and either heat, actinic light or nuclear particle radiation to convert them to the insoluble or thermoset stage.

The polyester resins useful in practicing this invention, whether liquid or solid, should be of the reactive type, that is, at least about 50 mol percent of the dibasic acid portion of the polyester resin should be an unsaturated dibasic acid such as maleic or fumaric acid. If these polyester resins are diluted or cut with a monomer, the polyester resin should preferably be cut with a polyfunctional monomer. The alcohol moiety of the polyester is generally a saturated, difunctional glycol containing 2 to 8 carbon atoms which may be cyclic or acyclic.

A reactive polyester may be prepared by reacting equimolar amounts of maleic anhydride and diethylene glycol at a temperature above 200° C. Water is azeotropically removed. The distillate is analyzed from time to time for starting ingredients, and a sufficient amount of material may be added to the reactor to maintain the initial proportions of the reacting ingredients. After 8 hours' reaction at such a temperature, a polyester is obtained in the form of a viscous liquid with an acid number of about 18.

A solid reactive polyester can be prepared by reacting equimolar amounts of a mixture of maleic anhydride and isophthalic acid with a 10% excess of propylene glycol. Water is removed azeotropically. The reaction is continued by heating until the acid number of the reaction mixture falls below 5. Excess unreacted propylene glycol is removed under vacuum and a solid polyester is obtained. Polyesters made from chlorendic anhydride and equimolar amounts of maleic anhydride or fumaric acid are well known reactive flame-retardant polyesters that can be used in practicing this invention.

Polyfunctional monomers useful in practicing this invention include, but are not limited to, diallyl phthalate, diallyl isophthalate, diallyl chlorendate, diallyl maleate, triallyl cyanurate, triallyl isocyanurate, glycol dimethacrylate, divinyl benzene and the like. So far as it is known to the inventors, any polyfunctional unsaturated monomer may be used in practicing this invention.

The polyunsaturated materials and polyhalogenated aromatic hydrocarbons can be either compounded into a thermosetting composition, such as a molding compound, in place of part of the conventional thermosetting polymer, or can be prereacted to form a kind of gel polymer by mixing about 3 to 2 mols of polyhalogenated compounds with 2 to 3 mols of a polyunsaturated monomer and subjecting the mixture to a free radical initiator, by incorporating 1 to 5% by weight, preferably about 1.5 to 3% by weight, of a peroxide catalyst in such a composition.

The preferred ratio of polyhalogenated aromatic compounds to polyunsaturated monomer, when making the prereacted materials, is 1 mol of polyhalogenated aromatic compound to each mol of polyunsaturated monomer. The free radical initiation should take place at a temperature of at least 130° C. and below the boiling point of the monomer. The reaction is exothermic and the temperature attained during the exothermic reaction period of a 100 g mass should be between about 200° and about 250° C. under adiabatic conditions. Generally the reaction mixture must reach a temperature of at least 130° C. for 2 to 5 minutes to initiate the exothermic reaction. Preferably the polyhalogenated aromatic hydrocarbon and the polyunsaturated monomer are selected so that a hard, grindable reaction product is produced. Fillers may be incorporated in the prereaction mixture, provided that the filler does not cause initiation of the reaction at less than 130° C. or inhibit reaction above 130° C. Inert fillers can comprise up to 60% by weight of the total composition.

Typical polychlorinated aromatic hydrocarbons used in the practice of this invention are chlorinated biphenyls and terphenyls which are known to be so stable and chemically inactive that they are used as plasticizers, heat exchange fluids and the like. Diallyl phthalate resins and polyester resins, which are typical of the polyunsaturated materials used in practicing this invention, when cured, are known to be plasticized by chlorinated biphenyls and terphenyls. For example, ordinary molded diallyl phthalate articles containing chlorinated biphenyls do not have the characteristic "hot hardness" of diallyl phthalate molded articles; when removed from a hot mold, the molded articles containing a chlorinated biphenyl are soft, like hot rubber, and harden only on cooling. Physical mixtures of highly chlorinated biphenyls (some with melting points above 150° C.) and an allylic prepolymer ball-milled together "ball up" or stick together in the ball mill (though either material alone will ball-mill in a conventional matter), thus showing solvation of resin by the polychlorinated aromatic compound. It is therefore quite surprising that, when there is at least 1 mol of a polyunsaturated monomer for every 3 mols of the polychlorinated aromatic compound, these polychlorinated aromatic hydrocarbons can be incorporated into a diallylic phthalate prepolymer or reactive polyester resin molding composition, which can be cured into articles that are essentially not plasticized by the polychlorinated aromatic compound.

The polyhalogenated aromatic hydrocarbon and polyunsaturated materials do not have to be prereacted. These materials may be incorporated into thermosetting resin compositions which are used for making moldings, castings, and laminetes without substantially degrading the cured physical properties of the thermosetting resins, provided there is at least 1 mol of difunctional monomer for every 3 mols of polyhalogenated aromatic hydrocarbon in the thermosetting resin composition and the curing temperature is at least 130° C. Surprisingly, when cured to the thermoset stage, these novel thermosetting resin compositions exhibit excellent electrical and mechanical properties and are flame resistant. The polychlorinated or polybrominated aromatics have little or no plasticizing effect upon the cured thermoset compositions and there is substantially no loss of thermoset properties.

Polychlorinated and polybrominated aromatic hydrocarbons are commercially available and represent a low-cost halogen source for making resistant thermoset resin compositions. Surprisingly, compared to the more expensive flame-retardant compositions made with polyester or diallylic phthalate resins and diallyl chlorendate, the compositions of this invention have somewhat improved electrical properties. These novel compositions can be used with ordinary flame-retardant additives and synergists used in chlorinated flame-retardant resin compositions such as antimony trioxide and hydrated alumina.

Polyphenylene ether polymers can be used to replace some or all of the polyunsaturated polymers in these novel compositions, provided at least an additional 0.05 part by weight of polyunsaturated monomer is added to the composition for each part of polyphenylene ether polymer. Typical polyphenylene ether polymers have a repeating structural unit of the formula

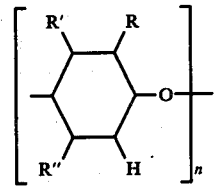

wherein the oxygen atom of one unit is connected to the benzene nucleus of the adjoining unit, n is a positive integer and is at least 10, R is a monovalent substituent selected from the group consisting of hydrogen, hydrocarbon radicals free of tertiary alpha-carbon atom, halohydrocarbon radicals having at least two carbon atoms between the halogen atom and the phenol nucleus and being free of a tertiary alpha-carbon atom, hydrocarbonoxy radicals being free of a tertiary alpha-carbon atom, and halohydrocarbonoxy radicals having at least two carbon atoms between the halogen atom and phenol nucleus and being free of tertiary alpha-carbon atoms, R' and R" are both monovalent substituents which are the same as R and, in addition, halogen. All of the polyphenylene ether polymers currently available have been found to be useful in practicing this invention. A method of producing polyphenylene ether polymers by forming self-condensation products of phenylene by reacting oxygen with a phenol is described in U.S. Pat. No. 3,306,875 issued Feb. 28, 1967. We have used polyphenylene ether polymers available from the General Electric Company, such as Noryl and Grades 631-101, 691-111 and 631-111, and found them all to be useful in practicing this invention. As far as we know, all of the polyphenylene ether polymers known in the art are useful in practicing this invention.

The novel compositions of this invention employ a free radical initiator in sufficient amounts to convert the (polyunsaturated monomer, polyunsaturated polymer and polychlorinated aromatic hydrocarbon) compositions to the thermoset state upon the application of heat. Free radical initiation may be accomplished by electron beams or other sources of radiation including actinic light. Conveniently, peroxide catalysts which promote reaction between unsaturated compounds with carbon to carbon double bond unsaturation may be used. The peroxide catalyst does not have to exclude homopolymerization, but must be a catalyst that does not produce only homopolymers. We have found that when peroxide catalysts and heat are used to cure the compositions, peroxides which have a minimum 10 hour half life in benzene at a temperature in excess of 100° C. should be used to some extent to catalyze the reactions of this invention. Mixed catalysts may be used, but at least part of the catalyst must be a catalyst having a 10 hour half life at a temperature in excess of 100° C. in benzene. We have successfully used dicumyl peroxide, tertiary butyl perbenzoate, 2,5-dimethyl-2,5-di(tert.-butylperoxy)hexyne-3 and 2,5-dimethyl-2,5-di(tert.-butylperoxy)hexane alone and in combination with benzoyl peroxide. We have found that dicumyl peroxide gives the best results in the novel compositions of this invention. Generally, catalysts well known in the art to cure allylic compositions are useful in practicing this invention.

A wide variety of water-insoluble, inert fillers may be used in preparing the molding compounds of this invention. Useful fillers include calcium carbonate, both precipitated and wet ground types, calcium silicate (wollastonite), silica, hydrated clays, calcined clays, chalk, calcium sulfate (anhydrous), barium sulfate, asbestos, glass (powdered), quartz, aluminum trihydrate, aluminum oxide, antimony oxide, magnesium oxide, inert iron oxides and groundstone such as granite, basalt, marble, limestone, sandstone, phosphate rock, travertine, onyx and bauxite. Additionally, inert fibrous materials may be used such as synthetic fibers, glass fibers, asbestos and cellulosic fibers. Up to 200 parts by weight of filler and/or fiber per 100 parts by weight of polyunsaturated polymerizable materials-polychlorinated aromatic compound may be used in these molding compositions.

Incidental additives widely incorporated in thermosetting molding compounds and laminates such as pigments, release agents, coupling agents, lubricants and other incidental additives may be incorporated in the compositions of this invention.

The novel molding compositions of this invention are prepared in conventional equipment and using techniques well known in the plastics industry to be useful in compounding allylic, epoxy, and polyester molding compounds. The molding compounds may be filled or unfilled and of the premixed, powdered, granular or dough type. The polyfunctional polymerizable materials, including polymer and monomer, a polyhalogenated aromatic hydrocarbon, free radical catalyst and an internal mold release, pigments, inhibitor, and so forth are simply mixed together in a heavy-duty mixer. The mixing may be done with or without the use of solvents. However, if solvents are used, they should be removed from the premixed compound before molding. The molding compositions can be molded under conditions normally used for allylic molding compositions, that is, they may be molded at from about 130° to 180° C. for about 1 to 60 minutes. Because of the varied viscosities of these novel molding compositions, the molding pressure may vary from near (0) zero to 10,000 pounds per square inch, depending on the composition.

There are two convenient ways to add the polychlorinated or polybrominated aromatic hydrocarbons to the polyunsaturated polymerizable materials. The preferred method of addition is to add the polyhalogenated aromatic hydrocarbon with the polyunsaturated materials as any other additive might be added in a molding compound or laminating solution. Although not the preferred method of addition, the polyhalogenated aromatic hydrocarbon may be added after it has been prereacted with a polyfunctional monomer. This is particularly useful where large amounts of monomer cannot be tolerated, as in high-pressure molding compounds. Direct addition of the polyhalogenated aromatic compound in preparation of the molding compound can be made by simply adding a polyunsaturated monomer and a polyhalogenated aromatic hydrocarbon to a molding compound prior to or during compounding in place of part of the polymer which would normally be used in the molding compound, providing there is at least 1 mol by weight of difunctional monomer present for each 3 mols of polyhalogenated aromatic compound.

The polyunsaturated polymerizable materials and polyhalogenated hydrocarbons have been prereacted to form solid reaction products by heating together a mixture of about 3 to 2 mols of polyhalogenated aromatic hydrocarbon with 2 to 3 mols of a polyunsaturated monomer in the presence of about 2% by weight of dicumyl peroxide. A number of filled and unfilled reaction products were prepared in a sigma blade mixer equipped with a steam jacket. Steam at a temperature of 160° C. (100 pounds of pressure) was circulated through the jacket. The reactants, and in some cases filler and catalyst, were simply added to the sigma blade mixer with 160° C. steam being supplied to the steam jacket and reacted together with agitation. Although the exact temperatures of the mixer blade and side walls were not known and accurate time measurements could not be made, reasonable initiation times, generally less than 10 minutes, were obtained. During the processing, the mixtures were highly fluid up to reaction and proceeded through reaction rapidly to a brittle rubber stage, finally breaking into small lumps. No particular advantage was observed for filled compositions. All of the reactants evaluated appeared to have about the same rate of reaction and the reaction appeared to be complete in a matter of 2 to 5 minutes after initiation. The hard reaction products were ball-milled for a period of 2 hours to produce a finely ground, uniform powder. The ratio of polyunsaturated monomer to polychlorinated aromatic compound was varied over ratios from 3 to 2 mols of monomer per 2 to 3 mols of polychlorinated aromatic compound. These products, due to their high chlorine content, were found to impart flame resistance to thermosetting compounds. These novel solid reaction products may be used in thermoplastics such as polyethylene, polyvinyl chloride acrylics and polystyrene, as well as rubber and other organic systems including thermosetting materials such as epoxy resins, polyurethane resins, polyimide resins and the like, where flame resistance is desirable.

These solid reaction products can also be added to unsaturated polyester resin compositions containing a monounsaturated monomer, for example a "styrene cut polyester". The physical properties of styrene-type polyester molding compounds containing the solid reaction products of this invention exceed the military specification requirements for polyester molding compounds as set forth in MIL M-14F specification for MAI 60 Styrene-Polyester Molding compounds.

The materials of this invention permit compounding versatility that has not previously been available. The materials can be used in processing compositions which are to be subjected to either low-pressure or high-pressure thermosetting conditions. Where it is desirable to incorporate these flame-retardant materials into high-pressure molding compounds such as in diallyl phthalate systems, the solid reaction products described above are preferred. These materials in the form of a fine powder are easily dispersed in an allylic resin composition in place of part of the allylic prepolymer. A diallylic phthalate molding composition containing the flame-retardant reaction products described above is processed in the same manner as conventional diallyl phthalate molding compounds. Up to 50% of the diallylic phthalate prepolymer can be replaced by these solid reaction products. Where it is desirable to achieve maximum flame retardancy in a molding compound or laminate with a minimum amount of halogen, it is advisable to incorporate antimony oxide along with the halogen-containing reaction product. Metal oxides such as hydrated alumina may be used with the antimony oxide. It is generally advisable to use a sufficient amount of the reaction product in a molding compound or laminate so that there is about 10 to 20% halogen based on the weight of the total organic content of the molding compound or laminate for high levels of flame resistance. However, less halogen is required where low levels of flame resistance can be tolerated.

Where low pressure, long flow laminating, impregnating and molding compositions are desired, the polyhalogenated aromatic hydrocarbon can be incorporated directly in allylic compositions or polyester compositions, provided there is at least 1 mol by weight of a polyunsaturated monomer for each 3 mols of polyhalogenated aromatic hydrocarbon and a peroxide catalyst which will not initiate the free radical curing at less than 100° C.

Polyphenylene ether polymers can be used to replace up to all of the polyunsaturated polymer in these novel compositions. When some or all of the polyunsaturated polymer is replaced with polyphenylene ether polymer, the compositions can be used as coating compositions, as glue lines for adhering materials to reinforced polymeric substrates or adhering two materials together, for use in reinforced laminates and as potting and encapsulating compositions. Although all of the polyunsaturated polymer can be replaced with polyphenylene ether polymer, it is preferred to retain at least some of the polyunsaturated polymer in the compositions, as the presence of the polyunsaturated polymer improves the handling characteristics of the compositions.

The novel compositions of this invention are readily used in preparing fiber reinforced laminates, generally fiber glass reinforced, by either the wet lay-up or prepreg techniques. Wet fiber glass lay-ups are prepared by making a liquid blend of the polymerizable materials, i.e., a monomer such as diallyl orthophthalate, a polymer containing carbon to carbon unsaturation or a polyphenylene ether polymer, a polyhalogenated aromatic compound, a catalyst, and other modifying ingredients such as dyes, pigments, fillers, inhibitors, glass coupling agents and so forth, which is poured onto one or more layers of a fibrous non-woven glass mat or woven glass fabric, which has preferably been treated with a glass coupling agent, to impregnate the reinforcing glass; after impregnation, the product is laminated under heat and mild pressures according to procedures well known in the art to be useful for curing allylic resin laminates.

A typical slow cure is effected by placing the wet lay-up in a vacuum bag and applying a vacuum of 28 to 30 inches of mercury for about 1 to about 5 hours to remove bubbles; the evacuated lay-up is then preferably augmented by autoclave pressure at 30 to 50 psi for 30 minutes at 82° C., 60 minutes at 120° C., 30 minutes at 150° C., 15 minutes at 160° C., and then cured an additional 60 minutes at 160° C. Thin sections can be cured more rapidly; for example, 30 to 50 psi for 60 minutes at 160° C. The amount of glass in the lay-up can be as high as 80%, although the preferred amount of reinforcing glass is 50 to 75% by weight of the laminate.

The novel resin compositions of this invention can be employed in the usual process for manufacture of fibrous reinforced thermoset resin laminates using the prepreg technique. A polymerizable liquid, i.e., monomer such as diallyl orthophthalate and the like, a polyhalogenated aromatic hydrocarbon, a polyphenylene ether polymer, and, where desired, a polymer containing carbon to carbon unsaturation such as an allylic prepolymer or a reactive type polyester resin, a catalyst and modifying ingredients such as dyes, pigments, fillers, glass coupling agents, inhibitors and so forth are mixed together and used to impregnate a fibrous non-woven mat or a woven fabric; where glass mats or fabrics are used, it may be desirable to have the glass treated with a glass coupling agent. The use of some solvent is usually required in order to reduce the viscosity level of the resin composition to make it suitable for application to the mat or fabric with conventional, commercial saturating or impregnating equipment.

It is not necessary to dissolve the polyphenylene ether polymer in the impregnating compositions of this invention. Simple uniform dispersion of the polyphenylene ether polymer powder in the solvent-monomer-polymerizable resin mixtures suffices. Prepregs are generally most economically processed with 30 to 60 parts of the resin composition dispersed in 70 to 40 parts of a suitable solvent such as acetone, methylethyl ketone, methyl isobutyl ketone, toluene, xylene, chloroform, methylene chloride, trichloroethylene, perchloroethylene and mixtures thereof and other solvents known in the trade to be useful in preparing allylic prepregs.

The mat or fabric is impregnated with the solvent solution and then dried to remove the solvent. After impregnation and drying of the impregnated fabric, the laminate is laid up and cured with heat and mild pressure using cure cycles and conditions similar to those used in curing the wet lay-up type laminates. Roving, including glass roving, is similarly pre-impregnated for processing by filament winding, techniques into pipe, other cylindrical shapes and hollow tapered and conical shapes. Products made by filament winding are generally cured at about 150° C. in 60 minutes. The fiber content of the prepreg laminates varies from about 15 to about 40% by weight for low density fibers and up to about 55 to 75% of the total weight of the cured laminate for glass mat or glass fabric laminates. The fiber content of filament wound constructions such as pipe, when made from impregnated glass roving, is generally about 70 to 80% of the total weight of the cured product.

Reinforced laminates of fibrous materials such as glass cloth, glass mats, synthetic fiber, cloth mats, paper and the like can be copper-clad to produce copper-clad laminates with excellent electrical properties to be used in preparing printed circuits and the like. Copper-clad laminates can be prepared by coating copper foil with a composition of this invention containing a polyphenylene ether polymer and then baking the coated copper foil at 160° C. for about 15 minutes. The baked resin coated foil is then placed on resin impregnated fibrous materials such as glass cloth which has been impregnated with the novel resin compositions of this invention, unsaturated polyester resins, diallylic phthalate prepolymers and the like, and then the "laminate" is pressed at 50 to 2,000 psi at 100° to 170° C. for at least 5 minutes to convert the resinous materials to the thermoset state. If desired, the coated copper foil can be laminated to almost any previously cured base. As indicated above, dicumyl peroxide is the preferred catalyst for producing the copper-clad laminates of this invention. The resulting copper-clad laminate has excellent adhesion of the copper to the base material and has excellent electrical properties. Quite surprisingly, when tested according to NEMA Standards Publication LI-1-1966, but at up to 200° C. rather than 25° C. standard, these copper-clad laminates retained essentially all of their electrical properties as measured at room temperature. Reinforced laminates made from those compositions of this invention which contain polyphenylene ether polymers adhere very well to the type of copper foil used in making printed circuit boards without precoating the foil. The compositions containing a polychlorinated aromatic hydrocarbon apparently "wet" the metal surface better than the similar compositions without the polychlorinated aromatic hydrocarbon disclosed in our copending application Ser. No. 682,326, filed Nov. 13, 1967.

Those compositions of this invention which contain polyphenylene ether resins as a portion of the system are useful as thermosetting coatings. They adhere strongly to a wide variety of substrates involving metals, ceramic bases and other resinous substances while providing excellent electrical insulating characteristics. They may be used as conformal coatings for electronic devices or as primar coats to bond additional electrical insulation to the devices. Many molding compounds used to the encapsulation of electronic components do not form good bonds to the devices and to the wire leads, thereby permitting access of moisture. When such devices or leads are first coated with the compositions of this invention, and then subjected to mold encapsulation, hermetically sealed systems are obtained which resist moisture even on prolonged exposure to boiling in water or high pressure steam.

The coatings may be formulated with all polymer components in solution. Useful solvents comprise chlorinated hydrocarbons and aromatic hydrocarbons. Alternatively, the coatings may be formulated as finely divided dispersions of the polymer system in liquid organic media. Useful dispersion media include organic ketones and esters. Dispersed coatings are preferred for most applications, since they may be formulated at high polymer solids levels yet are capable of application by brushing, spraying or roller coating. Coatings containing up to 80% solids can be applied by knife coating techniques, yet they flow out to smooth adherent insulating varnishes when subjected to oven baking at temperatures of 120° C. or higher.

The test methods appearing in the following list were followed in testing the molded and laminated test specimen made from the various compositions disclosed in the examples.

| | | |
|---|---|---|
| A. | Flexural Strength* | ASTM D-790 |
| B. | Modulus of Elasticity | ASTM D-790 |
| C. | Tensile Strength | ASTM D-638 |
| D. | Izod Impact | ASTM D-256 |
| E. | Compressive Strength | ASTM D-695 |
| F. | Deflection Temperature | ASTM D-648 |
| G. | Water Absorption | ASTM D-570 (a) |
| H. | Specific Gravity | ASTM D-792 |
| I. | Dielectric Constant | ASTM D-150 |
| J. | Dissipation Factor** | ASTM D-150 |
| K. | Volume and Surface Resistivity | ASTM D-257 |
| L. | Flame Resistance (Burning and Ignition Tests Method 1 and 2) | ASTM D-229 |
| M. | Hardness | ASTM D-785 |
| N. | Hardness (Rockwell) | ASTM D-785 |
| O. | Shear Strength (Modified for Flat Beams) | ASTM D-2344 |

*The flexural strengths at 150° C. for the unfilled resin systems were obtained after ½ hour conditioning at 150° C. Each individual specimen was held to ½ hour conditioning to avoid any ambiguity that may be caused by post-curing in the test oven. Only maximum flexural yield was measured.

**The wet test is conducted on samples which were conditioned by immersing the samples for 24 hours at 23° C. in distilled water, removing the samples, blotting them dry and then testing the samples as soon as practical according to the test method.

The following examples, illustrating the novel products disclosed herein, are given without any intention that the invention be limited thereto. All parts and percentages are by weight unless otherwise noted.

EXAMPLE 1

A series of samples were prepared which were simple mixtures of chlorinated terphenyl containing 60% chlorine or a chlorinated biphenyl containing 68% chlorine with different monomers and 2% by weight of dicumyl peroxide based on the total weight of the chlorinated aromatic compound and monomer. The samples were placed in a paper cup and a thermocouple connected to a recording thermocouple bridge was inserted in each of the samples. The samples were placed in an oven maintained at a temperature of 160° C. Various concentrations of the chlorinated aromatics with various monomer concentrations were prepared. Some of the samples tested were subjected to a 16 hour acetone Soxhlet extraction at the reflux temperature of acetone. The composition details, the reaction initiating temperature, the reaction peak exotherm temperature, the reaction time to peak exotherm, and the results of the reaction are contained in Table I.

Soxhlet extraction studies were made on some of the compositions. Mixtures of the unreacted chlorinated aromatics and the monomers yield clear solutions in chloroform and hot acetone. The chlorinated aromatics can only be partially extracted from the reaction product with monomers, and that fraction which is extracted is different from the original crystalline chlorinated aromatic in that it tends to be a resinous gum.

TABLE I

| BATCH REACTION AT 160° C., MONOMER STUDY | | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Chlorinated terphenyl, 60% chlorine (Aroclor 5460) | 50 | 45 | 40 | 60 | 65 | 60 | — | — | 40 | 74 | 87 | 78 |
| Chlorinated biphenyl, 68% chlorine (Aroclor 1268) | — | — | — | — | — | — | 62 | 62 | — | — | — | — |
| Diallyl phthalate | — | — | — | — | — | 40 | — | 38 | — | — | — | — |
| Diallyl isophthalate | 50 | 55 | 60 | 40 | 35 | — | 38 | — | — | — | — | — |
| Diallyl chlorendate | — | — | — | — | — | — | — | — | 60 | — | — | — |

TABLE I-continued

| | | | | | | | | | | | | |
|---|---|---|---|---|---|---|---|---|---|---|---|---|
| Triallyl cyanurate | — | — | — | — | — | — | — | — | — | 26 | — | — |
| Triallyl phosphate | — | — | — | — | — | — | — | — | — | — | 13 | — |
| Diallyl maleate | — | — | — | — | — | — | — | — | — | — | — | 22 |
| Divinyl benzene (55%) | — | — | — | — | — | — | — | — | — | — | — | — |
| Ethylene Glycol Dimethacrylate | — | — | — | — | — | — | — | — | — | — | — | — |
| Dicumyl peroxide | 2 | 2 | 2 | 2 | 2.5 | 2 | 2 | 2 | 2 | 2 | 2 | 2 |
| Initiation Temp. °C. | 130 | 130 | 130 | 135 | 155 | 125 | 145 | 140 | 135 | 125 | 135 | 122 |
| Peak Exotherm Temp. °C. | 223 | 211 | 227 | 218 | 273 | 222 | 225 | 216 | 205 | 245 | 248 | 230 |
| Time to Exotherm, min. | 3 | 5 | 7 | 4 | 5 | 3 | 3 | 3 | 3 | 4 | 4 | 3 |
| 16 hr. Acetone Soxhlet Extraction | | | | | | | | | | | | |
| Nature of Solution | | | | | | | | | | | | |
| Clear | | | | | | | | | | | | |
| Cloudy | | | | x | | | | x | x | | | |
| Dried Extract | | | | | | | | | | | | |
| Powder | | | | | | | | | | | | |
| Gum | | | | x | | | | x | x | | | |

| | 13 | 14 | Comparison C-1 | C-2 | C-3 | C-4 |
|---|---|---|---|---|---|---|
| Chlorinated terphenyl, 60% chlorine (Aroclor 5460) | 70 | 70 | 100 | — | — | 50 |
| Chlorinated biphenyl, 68% chlorine (Aroclor 1268) | — | — | — | 80 | 100 | 50 |
| Diallyl phthalate | — | — | — | — | — | — |
| Diallyl isophthalate | — | — | — | — | — | — |
| Diallyl chlorendate | — | — | — | — | — | — |
| Triallyl cyanurate | — | — | — | — | — | — |
| Triallyl phosphate | — | — | — | — | — | — |
| Diallyl maleate | — | — | — | — | — | — |
| Divinyl benzene (55%) | 30 | — | — | — | — | — |
| Ethylene glycol dimethacrylate | — | 30 | — | — | — | — |
| Dicumyl peroxide | 2 | 2 | 2 | 2 | 2 | — |
| Initiation temp. °C. | 125 | 115 | none | 110 | none | none |
| Peak exotherm temp., °C. | 235 | 200 | none | 250 | none | none |
| Time to exotherm, min. | 3 | 4 | ∞ | 5 | ∞ | ∞ |
| 16 hr. Acetone Soxhlet Extraction | | | | | | |
| Nature of Solution | | | | | | |
| Clear | | | x | x | | |
| Cloudy | | | | | x | |
| Dried Extract | | | | | | |
| Powder | | | x | | x | |
| Gum | | | | x | | |

EXAMPLE 2

Diallyl phthalate prepolymer, prereacted polychlorinated aromatic compound with monomer, molding compounds were prepared. The prereacted polychlorinated aromatic hydrocarbon and monomer reaction products were prepared in 3½ lb. batches. Chlorinated biphenyls, containing 68% combined chlorine (Aroclor 1268 from Monsanto Chemical Company), and a diallylic phthalate monomer were heated together in a ratio of 62 parts of chlorinated biphenyls to 38 parts of diallylic phthalate monomer with 2 parts by weight of dicumyl peroxide per 100 parts of Aroclor plus monomer. The reaction products were made in a 1-gallon sigma blade mixer equipped with a steam jacket. The steam to the jacket was at 160° C. and the internal temperature of the blade and side walls was about 120° C. Although accurate reaction time measurements could not be made, reasonably short reaction times of about 10 minutes were observed in preparing these reaction products. The reactants were highly fluid up to the point of gelation, from which point the reaction proceeded rapidly to a brittle stage, breaking up thereafter into small lumps. The prereacted materials were ball-milled for a 2-hour period in a 1½ gallon jar mill to produce 1,000 g of ground product. Reaction products were prepared using diallyl phthalate and diallyl isophthalate monomer and are designated Reaction Product #1 and Reaction Product #2 respectively in Table II. The reaction products were mixed with diallyl phthalate prepolymer and diallyl isophthalate prepolymer along with some catalyst, monomer and fillers to make molding compounds. The composition details and physical properties of samples molded from the molding compounds are found in Table II. For comparison, the table includes qualifying specifications for diallyl phthalate molding compounds for military use under MIL M-14F and MIL-19833. (The largest market for the diallyl phthalate molding compounds in the United States is for military applications.)

TABLE II

| | MOLDING COMPOUNDS | |
|---|---|---|
| Formulation | | Mil M-14F Specification Requirements for SDGF Molding Compounds |
| Diallyl phthalate prepolymer (Dapon 35 ®, FMC Corp.) | 74 | |
| Diallyl isophthalate prepolymer | | |

TABLE II-continued
MOLDING COMPOUNDS

| Formulation | | | Mil M-14F Specification Requirements for SDGF Molding Compounds |
|---|---|---|---|
| (Dapon M ®, FMC Corp.) | | 70 | |
| Diallyl phthalate monomer | 3 | | |
| Diallyl isophthalate monomer | | 3 | |
| Reaction Product #1[(1)] | 20 | | |
| Reaction Product #2[(2)] | | 30 | |
| tert Butyl perbenzoate | 3 | 3 | |
| Calcium Stearate | 2 | 2 | |
| Antimony oxide | 15 | 18 | |
| Wollastonite | 30 | 20 | |
| Glass (¼" strands) | 90 | 100 | |
| Properties | | | |
| Ignition time (sec.) | 93 | 98 | 90 (min.) |
| Burning time (sec.) | 78 | 76 | 90 (max.) |
| Heat Deflection Temp. °C. | 175 | 270 | 160 (min.) |
| Izod (ft. lbs.) Impact | 0.66 | 0.60 | 0.30 (min.) |
| Compressive (psi) Strength | 24,620 | 26,500 | 16,000 (min.) |
| Flexural (psi) Strength | 11,462 | 11,200 | 9,000 (min.) |
| Modulus (psi) of E Elasticity | $1.70 \times 10^6$ | $1.72 \times 10^6$ | — |
| Water absorption (%) | 0.12 | 0.11 | 0.40 (max.) |
| Specific Gravity | 1.902 | 1.897 | — |
| D.C. $10^3/10^6$ [(3)] | 4.50/4.39 | 4.36/4.24 | 4.6/4.4 (max.) |
| D.C. $10^3/10^6$ (wet) | 4.52/4.38 | 4.41/4.29 | 4.7/4.5 (max.) |
| D.F. $10^3/10^6$ [(4)] | .005/.005 | .005/.005 | .009/.015 (max.) |
| D.F. $10^3/10^6$ (wet) | .006/.005 | .006/.005 | .013/.017 (max.) |
| Volume Resist. (ohm) 720 hr. at 70° C., 100% R.H. | $1.0 \times 10^{12}$ | $0.8 \times 10^{12}$ | $5 \times 10^9$ (min.) |

[(1)]62/38 reaction product of chlorinated biphenyl with diallyl phthalate monomer.
[(2)]62/38 reaction product of chlorinated biphenyls with dially isophthalate monomer.
[(3)]Dielectric constant.
[(4)]Dissipation Factor.

EXAMPLE 3

A portion of the diallyl phthalate monomer-chlorinated biphenyl Reaction Product, Reaction Product #1 of Example 2, was incorporated into a diallyl phthalate polyester molding compound. Test specimens were molded from the compound for 3 minutes at 150° C. at 2,000 psi (pounds per square inch). The composition of the molding compound, the physical and electrical properties of the molded test specimens and the MIL-M-14F specification requirements for MAI 30 diallyl phthalate polyester molding compounds are shown in Table III.

TABLE III
MAI-30 (DAP-POLYESTER) COMPOUNDS

| Formulation | | MIL M-14 F Specificaton Requirements for MAI-30 (DAP-Polyester) Molding Compounds |
|---|---|---|
| Diallyl phthalate monomer | 35 | |
| Uncut isophtalate polyester resin, reactive type, | 35[(1)] | |
| Reaction product #1 | 30[(2)] | |
| Glass (¼" strands) | 57 | |
| Hydrated alumina | 48 | |
| Wollastonite | 48 | |
| Antimony oxide | 18 | |
| Calcium stearate | 2 | |
| tert Butyl perbenzoate | 2 | |
| Physical Properties | | |
| Compressive | 21,200 | 20,000 (min.) |
| D.C. $10^3/10^6$ | 4.95/4.54 | 6.3/6.2 (max.) |
| D.C. $10^3/10^6$ (wet) | 5.15/4.63 | 6.4/6.4 (max.) |
| D.F. $10^3/10^6$ | .010/.009 | .015/.012 (max.) |
| D.F. $10^3/10^6$ (wet) | .012/.011 | .017/.015 (max.) |
| Flexural (psi) | 16,700 | 14,000 (min.) |
| Flexural Modulus (psi) | $2.0 \times 10^6$ | — |
| Heat Deflection Temp. °C. | 272 | 200 (min.) |
| Impact (ft. lbs.) | 4.37 | 3.0 (min.) |
| Water Absorption (%) | 0.17 | 0.5 (max.) |
| Ignition time (sec.) | 105 | 100 (min.) |
| Burning time (sec.) | 17 | 75 (max.) |
| Rockwell Hardness (M) | 108 | — |
| Specific Gravity | 1.93 | — |
| Vol. Resistivity (ohm.cm.) | $1.2 \times 10^{15}$ | — |
| Surface Resistivity (ohm) | $2.8 \times 10^{15}$ | — |

[(1)]Equimolar amounts of maleic anhydride and isophthalic were heated together with a 10% excess of diethylene glycol. Water was removed azeotropically and the heating, at about 200° C. was continued until the acid number of the polyester resin fell below 6. Excess diethylene glycol was removed under vacuum and the polyester resin recovered.
[(2)]62/38 Reaction Product of chlorinated biphenyl with diallyl phthalate monomer from Example 2.

EXAMPLE 4

Example 3 was repeated except that a styrene polyester was used rather than a DAP polyester with a portion of the diallyl phthalate-chlorinated biphenyl gel of Example 2. The molding compositions were molded for 3 minutes at 150° C. at 2,000 psi. The composition of the molding compound, physical and electrical properties of the molding samples, and, for comparison, the MIL M-14 F specification requirements for MAI 60 flame-resistant styrene polyesters are shown in Table IV.

TABLE IV
STYRENE-POLYESTER MOLDING COMPOUNDS

| Formulation | | MIL M-14 F Specification Requirements for MAI-60 (Styrene-Polyester) Molding Compounds |
|---|---|---|
| Monomer, styrene | 24.5 | |
| Polyester Resin[1] | 45.5 | |
| Reaction Product #1[2] | 30 | |
| Glass (¼" strands) | 67 | |
| Hydrated alumina (Hydral 710) | 48 | |
| Wollastonite | 48 | |
| Antimony oxide | 18 | |
| Calcium stearate | 2 | |
| tert Butyl perbenzoate | 2 | |
| Properties | | |
| Compressive (psi) | 23,150 | 18,000 (min.) |
| D.C. $10^3/10^6$ | 4.77/4.53 | 6.0/5.7 (max.) |
| D.C. $10^3/10^6$ (wet) | 5.04/4.51 | 7.0/6.0 (max.) |
| D.F. $10^3/10^6$ | .012/.008 | .03/.03 (max.) |
| D.F. $10^3/10^6$ (wet) | .016/.013 | .08/.05 (max.) |
| Flexural (psi) | 17,700 | 12,000 (min.) |
| Flexural modulus (psi) | $2.0 \times 10^6$ | — |
| Heat Deflection Temp. °C. | 272 | 200 (min.) |
| Impact (ft. lbs.) | 7.45 | 6.0 (min.) |
| Water Absorption (%) | 0.17 | 1.5 (max.) |
| Ignition time (sec.) | 95 | 90 (min.) |
| Burning time (sec.) | 58 | 90 (max.) |
| Rockwell Hardness (M) | 107 | — |
| Specific Gravity | 1.898 | |

[1] Reactive polyester resin from Example 3 made by reacting equimolar portions of maleic and isophthalic acids with a 10% excess of diethylene glycol.
[2] 62/38 Reaction Product #1 of chlorinated biphenyl with diallyl phthalate monomer from Example 2.

EXAMPLE 5

High pressure laminates containing diallylic phthalate-polychlorinated aromatic reaction products were prepared using polychlorinated aromatic diallylic phthalate reaction products made according to Example 2. Sixty parts of polychlorinated aromatic compound (Aroclor 5460), a chlorinated terphenyl containing 60% by weight of chlorine, was reacted with 40 parts of diallylic phthalate monomer and 2 parts of dicumyl peroxide as described in Example 2, and is labeled Reaction Product #3 in Table V. A similarly prepared reaction product, using 40 parts of diallyl isophthalate monomer in place of diallyl phthalate monomer, is labeled Reaction Product #4 in Table V. A glass cloth laminate was prepared as follows: A "resin blend" of the polychlorinated aromatic diallylic phthalate reaction product with the corresponding diallylic phthalate prepolymer and a small amount of diallylic phthalate monomer and 2 parts of dicumyl peroxide catalyst per 100 parts of reactants as shown in Table V was dispersed, in the amount of 100 parts by weight of the "resin blend", in 100 parts by weight of acetone. Woven glass cloth was impregnated with this dispersion and allowed to dry at least 48 hours in air at room temperature. The impregnated glass cloth, often termed prepreg, was cut into 12" by 12" squares and stacked 18 plies deep with the warp yards parallel. The pre-impregnated lay-up was laminated in a flat bed press for 30 minutes at 80° C. at contact pressure, 30 minutes at 120° C. at 300 psi and 1 hour at 160° C. at 300 psi. Two samples were prepared, one using diallyl phthalate monomer and another sample using diallyl isophthalate prepolymer and diallyl isophthalate monomer. The composition details of the resin mixture used to impregnate the glass fabric, the resin content of the prepregs prepared from the resin systems and the physical properties of the cured laminates are found in Table V.

TABLE V
HIGH PRESSURE DIALLYL PHTHALATE CHLORINATED TERPHENYL GEL LAMINATES

| Formulation | | |
|---|---|---|
| Reaction Product #3 | 50 | |
| Reaction Product #4 | | 50 |
| Diallyl phthalate prepolymer (Dapon 35 ®) | 45 | |
| Diallyl isophthalate prepolymer (Dapon M ®) | | 45 |
| Diallyl phthalate monomer | 5 | |
| Diallyl isophthalate monomer | | 5 |
| Dicumyl peroxide | 2 | 2 |
| Physical Properties | | |
| Burning [1] time (sec.) | 12.7 | 32 |
| Compressive (psi) | 49,500 | 44,900 |
| Rockwell Hardness (M) | 118 | 122 |
| Flexural (psi) R.T. | 67,800 | 76,200 |
| 150° C. | 13,700 | — |
| Modulus (psi) R.T. | $2.43 \times 10^6$ | $2.92 \times 10^6$ |
| 150° C. | $0.97 \times 10^6$ | — |
| Tensile (psi) | 49,100 | 50,400 |
| Specific Gravity | 1.822 | 1.858 |
| Shear (psi) | 4,010 | 3,400 |
| Flexural (psi) 2 hr. boil | 67,900 | 72,700 |
| Modulus (psi) 2 hr. boil | $2.48 \times 10^6$ | $2.89 \times 10^6$ |
| Flexural (psi) after aging: | at 155° C. | at 180° C. |
| 1 day | 68,200 | 72,800 |
| 4 days | 70,900 | 75,300 |
| 10 days | 65,600 | 77,800 |
| D.C. $10^3/10^6$ | 4.46/4.35 | 4.26/4.22 |
| D.C. $10^3/10^6$ (wet) | 4.52/4.38 | 4.27/4.18 |
| D.F. $10^3/10^6$ | .0055/.0059 | .0039/.0042 |
| D.F. $10^3/10^6$ (wet) | .0063/.0061 | .0042/.0048 |
| Vol. Resist. (ohm. cm.) | $5.2 \times 10^{15}$ | $12.9 \times 10^{15}$ |
| Surface Resist. (ohm.) | $1.3 \times 10^{15}$ | $1.19 \times 10^{15}$ |
| Insulation Resist. (ohm.) | | |
| 10 day cycle 72/70/100 | $1.25 \times 10^{10}$ | $6.3 \times 10^{11}$ |
| 72/25/100 | $5.60 \times 10^{11}$ | $3.6 \times 10^{12}$ |
| 100/70/100 | $8.3 \times 10^9$ | $1.9 \times 10^{11}$ |

[1] ASTM D229, Part I

EXAMPLE 6

A molding compound was prepared directly from a mixture of a chlorinated terphenyl (Aroclor 5460 containing 60% combined chlorine by weight) and diallyl phthalate prepolymer (Dapon 35) and diallyl phthalate monomer. The following composition was compounded as an "SDG-F Type" flame-resistant molding compound designed to meet Military Specification MIL M-14 F.

| | Parts by weight |
|---|---|
| Diallyl phthalate prepolymer (Dapon 35) | 73 |
| Diallyl phthalate monomer | 9 |
| Chlorinated terphenyl (60% combined chlorine) | 18 |
| Chopped glass (¼" strands) | 90 |
| Clay, hydrated | 30 |
| Antimony oxide | 15 |
| Calcium stearate | 1 |
| Tertiary butyl perbenzoate | 3 |
| Acetone | 160 |

All the ingredients in the above were mixed together in a heavy-duty mixer until the glass and the fillers were thoroughly wetted. The composition was spread on trays and the acetone was allowed to evaporate at room temperature. The composition was then compounded on a two-roll rubber mill at a temperature of 80°-90° C. The mill sheet was cooled and ground into a molding powder. Test pieces molded at 150° C. at 2,000 psi for a minimum of 1.5 minutes showed full cure as measured by development of "hot hardness" and resistance to boiling chloroform. The test data in the following table show the properties of the above molded compositions compared to the MIL M-14 F specification requirements for diallyl phthalate molding compounds.

TABLE VI

CHLORINATED TERPHENYL AROCLOR/ MONOMER/DAPON SDG-F COMPOUND

|  | Example 6 | Comparison[1] |
|---|---|---|
| Ignition time (sec.) | 97 | 90 (min.) |
| Burning time (sec.) | 70 | 90 (max.) |
| Heat Deflection Temp. C. | 165 | 160 (max.) |
| Rockwell Hardness (M) | 115 | — |
| Izod Impact (ft. lb.) | 0.58 | 0.30 (min.) |
| Flexural strength, psi | 12,120 | 9000 (min.) |
| Modulus, psi | $1.72 \times 10^6$ | — |
| Compressive strength, psi | 23,060 | 16,000 (min.) |
| Water absorption (%) | 0.08 | 0.30 |
| Specific gravity | 1.880 | — |
| D.C. $10^3/10^6$ | 4.44/4.35 | 4.6/4.4 (max.) |
| D.C. $10^3/10^6$ (wet) | 4.47/4.37 | 4.7/4.5 (max.) |
| D.F. $10^3/10^6$ | .0044/.0043 | .009/.015 (max.) |
| D.F. $10^3/10^6$ (wet) | .0054/.0047 | .013/.017 (max.) |
| Vol. Resist., (ohm cm) | $6.76 \times 10^{15}$ | — |
| Surf. Resist., (ohm) | $7.95 \times 10^{15}$ | — |
| Vol. Resist. (ohm) (720 hrs. 70° C. at 100% relative humidity) | $1.97 \times 10^{13}$ | $5 \times 10^9$ |

[1]MIL M-14F Specification requirement properties for glass filled flame-resistant diallyl phthalate molding compound.

EXAMPLE 7

Wet lay-up or vacuum bag laminates were prepared using a diallylic phthalate prepolymer, a diallylic phthalate monomer and chlorinated terphenyl (Aroclor 5460). The wet lay-up was prepared by making a liquid blend of the monomer, chlorinated terphenyl and diallylic phthalate resin and catalyst. The liquid polymerizable resin composition was poured onto several layers of woven glass fabric. After impregnation, the laminates were placed in a vacuum bag and evacuated to remove air from the polymerizable liquid resin mixture. The lay-up was laminated while maintaining the vacuum at pressures of 15 psi or less, as in the very early stages of cure it was very difficult to maintain pressure on the polymerizable liquid. Full cure was obtained after about 15 minutes at 150° C. as measured by hot hardness, hot strength, and solvent resistance in boiling acetone. This laminate construction was also cured in a vacuum bag by exposure to a 3 MEV (million electron volts) electron beam in multiple passes of 5 megarads each until a room temperature Barcol hardness of 60 was developed. The polymerizable liquid details and the physical properties of the cured laminates are set forth in Table VII.

TABLE VII

VACUUM BAG LAMINATES

| Formulation | | |
|---|---|---|
| Diallyl phthalate prepolymer (Dapon 35 ®) | 50 | |
| Diallyl isophthalate prepolymer (Dapon M ®) | | 50 |
| Diallyl phthalate monomer | 20 | |
| Diallyl isphthalate monomer | | 20 |
| Chlorinated terphenyl | | |
| (Aroclor 5460) | 30 | 30 |
| Dicumyl peroxide | 2 | 2 |
| Burning time (ASTM D229, Pt.1) | 16 sec. | 27 sec. |
| Specific Gravity | 2.104 | 2.040 |
| Percent Resins | 28.0 | 32.7 |
| Rockwell Hardness (M) | 117 | 121 |
| Flex. strength, psi, 25° C. | 94,000 | 101,700 |
| Flex. strength, psi, 150° C. | 25,410 | 6,050[1] |
| Modulus, psi, 25° C. | $4.08 \times 10^6$ | $3.86 \times 10^6$ |
| Modulus, psi, 150° C. | $2.49 \times 10^6$ | $1.47 \times 10^6$ [1] |
| Compressive Str., psi | 49,110 | 48,740 |
| Tensile Str., psi | 63,460 | 62,110 |
| Shear, psi | 3710 | 2040 |
| Flex., 2 hr. H₂O/100° C. | 93,390 | 88,810 |
| Modulus 2 hr. H₂O/100° C. | $4.18 \times 10^6$ | $3.26 \times 10^6$ |
| Flexural (psi) after aging: | at 155° C. | at 180° C. |
| 1 day | 101,900 | 95,400 |
| 4 days | 97,660 | 98,870 |
| 10 days | 93,900 | 88,580 |
| D.C. $10^3/10^6$ | 4.94/4.85 | 4.72/4.65 |
| D.C. $10^3/10^6$ (wet) | 5.00/4.84 | 4.81/4.65 |
| D.F. $10^3/10^6$ | .0054/.0049 | .0068/.0040 |
| D.F. $10^3/10^6$ (wet) | .0088/.0057 | .0091/.0048 |
| Vol. Resistivity, (ohm cm.) | $4.17 \times 10^{15}$ | $3.56 \times 10^{15}$ |
| Surf. Resistivity, (ohm) | $5.08 \times 10^{14}$ | $2.36 \times 10^{14}$ |

[1] Test run at 260° C.

EXAMPLE 8

A premixed molding compound containing a portion of the polyester resin described in Example 3 and a polychlorinated aromatic compound was prepared. The formulations listed in Table VIII were mixed in a heavy duty mixer until the glass and fillers were thoroughly wetted with the polyester resin-monomer-chlorinated terphenyl mixture. The compositions of this invention were compared with similarly compounded conventional diallyl phthalate polyesters. The composition details and physical properties are set forth in the following Table. The test specimens were molded at 1000 psi at 150° C. for three minutes.

TABLE VIII

PREMIX MOLDING COMPOUNDS

| Formulation | | |
|---|---|---|
| Polyester resin, Reactive isophthalate type[1] | 50 | 41 |
| Diallyl phthalate monomer | 50 | 41 |
| Chlorinated terphenyl (60% chlorine) | 0 | 18 |
| ¼" Chopped glass fibers | 57 | 57 |
| Wollastonite | 55 | 55 |
| Hydrated alumina (Hydral 710) | 55 | 55 |
| tert Butyl perbenzoate | 2 | 2 |
| Zinc stearate | 1 | 1 |
| Antimony oxide | 18 | 18 |
| Physical properties | | |
| Igniton time, sec. | 103 | 102 |
| Burning time, sec. | 244 | 31 |
| Deflect. temp. °C. | 283 | 270 |
| Rockwell Hardness (M) | 102 | 103 |
| Izod Impact (ft. lbs) | 4.90 | 6.90 |
| Specific Gravity | 1.935 | 1.953 |
| Water absorption, (%) | 0.37 | 0.25 |
| Compressive str., psi. | 20,360 | 21,450 |
| Flex. strength, psi. | 15,860 | 18,450 |
| Modulus, psi. | $2.0 \times 10^6$ | $2.01 \times 10^6$ |
| D.C. $10^3/10^6$ | 5.56/4.85 | 5.11/4.66 |
| D.C. $10^3/10^6$ (wet) | 6.25/5.08 | 5.46/4.79 |
| D.F. $10^3/10^6$ | .023/.016 | .014/.010 |
| D.F. $10^3/10^6$ (wet) | .041/.025 | .018/.016 |
| Vol. Resistivity, ohm-cm | $6.82 \times 10^{14}$ | $8.74 \times 10^{14}$ |

TABLE VIII-continued
PREMIX MOLDING COMPOUNDS

| Formulation | | |
|---|---|---|
| Surf. Resistivity ohms | $7.43 \times 10^{15}$ | $5.13 \times 10^{15}$ |

(1) Reactive polyester resin from Example 3 made by reacting equimolar portions of maleic and isophthalic acids with a 10% excess of diethylene glycol.

EXAMPLE 9

A low-pressure laminate containing diallyl isophthalate monomer and prepolymer, a chlorinated terphenyl and polyphenylene ether polymer was prepared in which the following formulation was used to saturate glass cloth from which the laminate was prepared.

| | Parts by Weight |
|---|---|
| Polyphenylene ether resin (General Electric Grade 691-111) | 25 |
| Chlorinated terphenyl containing 60% combined chlorine (Aroclor 5460) | 15 |
| Diallyl isophthalate prepolymer (Dapon M) | 30 |
| Diallyl isophthalate monomer | 30 |
| Dicumyl peroxide (recrystallized) | 3 |
| Acetone | 130 |

The diallyl isophthalate prepolymer and polyphenylene ether polymer were ball-milled together until 70% of the product was −200 mesh (U.S. Standard Sieve Series 1940). The chlorinated terphenyl-diallyl isophthalate monomer and dicumyl peroxide were dissolved in the acetone solvent and the ball-milled powder was added to this solution to make up a saturating mixture. Woven glass cloth, type 181, was impregnated with this mixture and allowed to dry at least 48 hours at room temperature. The dry impregnated glass cloth was cut into 12″ by 12″ squares, stacked 18 plies deep with the warp yarns parallel. The pre-impregnated lay-up was made in a flat bed press for 30 minutes at 80° C. at contact pressure, 30 minutes at 120° C. at 300 psi and 1 hour at 160° C. at 300 psi. The laminated sample had a resin content of 44% and was found to be non-burning in ASTM Flammability Test D-229, Part 1. The following physical properties were obtained on the laminated sample:

| Laminate Physical and Electrical Properties | |
|---|---|
| Resin content | 44% |
| Specific Gravity | 1.752 |
| Rockwell Hardness (M) | 120 |
| Compressive strength, psi | 50,400 |
| Tensile strength, psi | 43,700 |
| Flexural strength, psi at 23° C. | 67,300 |
| Flexural strength, psi at 200° C. | 13,700 |
| Flexural modulus at 23° C., psi | $3.0 \times 10^6$ |
| Flexural modulus at 200° C., psi | $1.3 \times 10^6$ |
| Tensile shear strength, psi | 3,530 |

EXAMPLE 10

A vacuum bag laminate was prepared from a composition containing no polyunsaturated polymer. Thirty parts of polyphenylene ether polymer was ball-milled 1 hour together with 10 parts of trihydrate of aluminum oxide (Hydral 710 from Alcoa). The ball-milled materials were mixed with a solution containing 90 parts of diallyl isophthalate monomer, 17.5 parts of chlorinated terphenyl containing 60% by weight combined chlorine (Aroclor 5460) and 4.5 parts of dicumyl peroxide catalyst (DiCup R) with stirring at 60° to 80° C. This mixture was used to saturate 12 plies of 181 glass cloth 12″ square. The impregnated cloth was stacked 12 plies deep with the warp yarns parallel. The impregnated lay-up was placed in a vacuum bag which was then evacuated until essentially all of the air was removed. The lay-up was then laminated in a flat bed press, maintaining the vacuum, throughout the lamination, for 1 hour at 93° C., 1 hour at 121° C. and 1 hour at 160° C. The cured laminate had good "hot" hardness when removed from the vacuum bag at about 150° C. and when cooled was a tough flexible laminate.

EXAMPLE 11

A copper-clad laminate was prepared by roller coating onto 1 oz. copper foil (1 oz. per sq. ft.), a standard copper used in the preparation of printed circuit boards, the following coating composition:

| Ingredients | Parts by weight |
|---|---|
| Polyphenylene ether polymer (General Electric Company Grade 631-101) | 60 |
| Diallyl isophthalate prepolymer (FMC Corp., Dapon M ®) | 10 |
| Diallyl isophthalate monomer | 10 |
| Chlorinated terphenyl, 60% chlorine (Aroclor 5460), Monsanto Chemical Corp. | 20 |
| Dicumyl peroxide | 5 |
| Chloroform | 150 |
| Trichloroethylene | 150 |

After solvent removal and baking for 5 minutes at 165° C., the average film thickness of the coating on the copper was 1.5 mil. An 18 ply, low pressure, gloss cloth laminate was prepared for laminating as described in Example 9. The treated copper foil was placed on one side of the laminate, with the treated side of the foil facing the laminate, and the laminates was then cured as described in Example 9.

The bond and peel strength of the copper foil to the laminate base after laminating exceeded 10 lbs. per inch. This bond strength was essentially unchanged after immersion in a solder bath at 260° C. for 2 minutes.

EXAMPLE 12

A copper-clad glass cloth laminate was prepared using the following coating composition to saturate glass cloth as described in Example 9:

Three hundred twenty parts of polyphenylene ether polymer (General Electric Grade 691-111), 80 parts of diallyl isophthalate prepolymer (Dapon M ®) and 50 parts of hydrated alumina (Hydral 710) were ground together in a ceramic ball mill until 70% of the mixture passed through a 200 mesh sieve (U.S. Standard Sieve Series, 1940). Forty-five parts of this powdered mixture was added with agitation to a solution of 30 parts of diallyl phthalate monomer, 30 parts of chlorinated terphenyl (Aroclor 5460), 10 parts of diallyl isophthalate prepolymer (Dapon M ®), and 5 parts of recrystallized dicumyl peroxide (DiCup R - Hercules Powder Company) in 100 parts of methyl ethyl ketone.

The saturated glass cloth was cut into 12″ squares prepared for laminating as described in Example 9. A 12″ square of 1 oz. copper foil was placed on one side of the saturated glass cloth lay-up which was then laminated (cured) as described in Example 9 to produce a copper-clad laminate. When laminated, the copper foil had a bond strength to the glass cloth base in excess of 8 lbs. per inch peel strength at 90°. This bond strength was maintained, and the laminate maintained its integrity, when immersed for 2 minutes in solder at 260° C.

EXAMPLE 13

A silicon diode was coated by dipping the diode into the polymerizable coating composition of Example 11. Only about ⅛" of the metal leads (Covar) to the diode, nearest to the body of the diode, was coated, thereby leaving part of the leads uncoated to facilitate soldering. The coated diode was baked in an air circulating oven at 170° C. for 2 minutes to remove solvent and polymerize the coating. The resulting coating was between 1 and 2 millimeters thick.

The coated diode was then mold encapsulated using the following encapsulating composition:

|  | Parts by Weight |
| --- | --- |
| Diallyl phthalate prepolymer (Dapon D - FMC Corp.) | 45 |
| Glass, ¼" chopped fibers | 25 |
| Clay, calcined | 30 |
| Calcium stearate | 0.5 |
| Tertiary butyl perbenzoate | 1.5 |

The encapsulation was done by transfer molding at a ram pressure of 1,000 psi at 160° C. for a cure time of 3 minutes. The encapsulated silicon diode showed no loss of electrical performance after 100 hours' immersion in boiling water.

A second silicon diode was coated as described above. This second coated diode was mold encapsulated as described above using a bisphenol A diglycidol ether type epoxy polymer encapsulating composition (Polyset 300 available from Morton Chemical Company). The wet electrical performance of the coated-encapsulated diode was improved as compared to a similar diode that was not coated prior to encapsulation with the epoxy encapsulating composition.

EXAMPLE 14

Vacuum bag laminates were prepared using diallyl isophthalate prepolymer and monomer, brominated biphenyl and in one example a polyphenylene ether polymer. Woven glass cloth, type 181, was impregnated with the mixtures set forth below and allowed to dry for 48 hours at 25° C. The dry impregnated glass cloth was cut into 12" squares, stacked 18 plies deep with the warp yarns parallel. The impregnated lay-up was molded by the vacuum-bag technique. Full cure was obtained after 15 minutes at 150° C.

TABLE IX

| Formulation | | |
| --- | --- | --- |
| Diallyl isophthalate monomer | 250 | 350 |
| Diallyl isophthalate prepolymer | 650 | 310 |
| Hexabromobiphenyl | 200 | 150 |
| Dicumyl peroxide | 30 | 30 |
| Gamma methacryloxypropyl-trimethylsilane | 5 | 5 |
| Hydroquinone | 0.3 | 0.3 |
| Aluminum trihydrate | 70 | 40 |
| Methyl ethyl ketone | 400 | 400 |
| Polyphenylene ether blend [1] | — | 285 |
| Physical Properties | | |
| Resin content, weight % | 29.8 | 35.1 |
| Rockwell hardness (M) | 120 | 122 |
| Compressive strength, psi | 26,400 | 44,500 |
| Flexural strength, psi at 25° C. | 65,800 | 83,900 |
| psi at 205° C. | 31,100 | 22,000 |
| after 2 hours in boiling water | 47,800 | 76,900 |
| Flexural modulus, psi at 25° C. | $2.7 \times 10^6$ | $2.8 \times 10^6$ |
| psi at 205° C. | $2.6 \times 10^6$ | $1.8 \times 10^6$ |
| after 2 hours in boiling water | $2.6 \times 10^6$ | $2.9 \times 10^6$ |
| Tensile strength, psi | 52,600 | 55,300 |
| Shear strength, psi at 25° C. | 3,010 | 5,400 |
| psi at 205° C. | 1,740 | 1,470 |
| Mosture absorption, 48 hours under water at 50° C., weight % | .44 [1] | .08 |
| Specific gravity | 1.974 | 1.911 |
| Dielectric constant $10^3$/HZ dry | 4.53 | 4.30 |
| $10^6$/HZ dry | 4.46 | 4.33 |
| Burning test (ASTM D-635) | non-burning | non-burning |

[1]200 parts of polyphenylene ether polymer, 57 parts of diallyl isophthalate prepolymer, 28 parts of aluminum trihydrate, ball-milled together for 12 hours.
[2]Sample contained some small voids.

Obviously, these examples can be multiplied indefinitely in view of the possible permutations and combinations of resins, polychlorinated aromatic hydrocarbons, fillers and additives known in the art to be useful in preparing molding compounds and laminates. The principle of this invention has been explained and exemplified so that it can readily be practiced by those skilled in the art. The best mode contemplated by the inventors has been set forth. Clearly, within the scope of the appended claims, the invention may be practiced by those skilled in the art having benefit of this disclosure, otherwise than as specifically described and exemplified herein.

What is claimed is:

1. A solid composition of matter for use in thermosetting compositions, which consists essentially of the hard, flame-retarding reaction product formed by heating together
    3 to 2 mols of a polyhalogenated aromatic hydrocarbon selected from the group consisting of chlorinated or brominated biphenyls, chlorinated or brominated terphenyls, and chlorinated naphthalenes and containing at least 50% by weight of chlorine or bromine and having a molecular weight of at least 200 with
    2 to 3 mols of a polyunsaturated monomer selected from the group consisting of diallyl phthalate, diallyl isophthalate, diallyl chlorendate, diallyl maleate, triallyl cyanurate, triallyl isocyanurate, glycol dimethacrylate, and a divinyl benzene at a temperature of at least 130° C. up to 250° C. in the presence of 1 to 5% by weight of a peroxide catalyst which has a 10 hour half-life in benzene at a temperature in excess of 100° C.

2. The composition of claim 1 in which the peroxide catalyst is selected from the group consisting of dicumyl peroxide, tertiary butyl perbenzoate, 2,5-dimethyl-2,5-di(tertiary-butylperoxy)-hexyne-3 and 2,5-dimethyl-2,5-di(tertiary-butylperoxy) hexane.

3. The composition of claim 1 in which the mole ratio of polyhalogenated aromatic hydrocarbon to polyunsaturated monomer is about 1:1.

* * * * *